United States Patent Office 2,841,598
Patented July 1, 1958

2,841,598

ESTRADIOL-17β-PHENYL PROPIONATE

Colin Leslie Hewett, London, England, assignor to Organon Inc., Orange, N. J., a corporation of New Jersey No Drawing. Application April 17, 1956
Serial No. 578,564

Claims priority, application Great Britain January 21, 1952

1 Claim. (Cl. 260—397.5)

The present invention relates to derivatives of compounds of the cyclopentano polyhydrophenanthrene series and more particularly to β-phenyl propionic acid esters of estrogenic steroid hormones, and to a process of making such esters.

The present application is a continuation-in-part of my co-pending application, Serial No. 331,116, filed January 13, 1953, now Patent No. 2,755,292, and entiled "New Derivatives of Compounds of the Cyclopentano Polyhydrophenanthrene Series and the Preparation Thereof."

It is known to convert hormones of the cyclopentano polyhydrophenanthrene series into esters, the activity of which is greater than that of the hormones themselves. Esters with propionic acid, benzoic acid, and phenyl acetic acid have proved to be of value. It has also been proposed to esterify steroid hormones with cyclopentyl propionic acid in order to produce esters of said hormones having a prolonged activity.

It is one object of the present invention to provide new and valuable esters of estrogenic steroid hormones such as estradiol and 17-ethinyl estradiol, said new esters having a considerably prolonged activity over that of the known and commonly used estradiol-17-monobenzoate.

Another object of the present invention is to provide a process of producing highly active esters of estrogenic hormones such as estradiol and 17-ethinyl estradiol.

Other objects of the present invention and advantageous features thereof will become apparent as the description proceeds.

The new and highly valuable esters of estradiol and 17-ethinyl estradiol according to the present invention are esters with β-phenyl propionic acid. Such esters are produced, for instance, by condensation of estradiol or 17-ethinyl estradiol with β-phenyl propionic acid anhydride. The condensation can be carried out in the absence of a solvent whereby the reaction time is preferably reduced by heating the reaction mixture. It is also possible to operate in the presence of a solvent. Suitable solvents are, for instance, pyridine, benzene, or other solvents not affected by the anhydride or mixtures thereof.

In place of β-phenyl propionic acid anhydride, there can also be used as esterifying agent a β-phenyl propionic acid halide, preferably its acid chloride. The reaction is carried out in the presence of a tertiary organic base such as pyridine, dimethylaniline, picoline, collidine, lutidine which is added in an amount sufficient to bind the hydrogen halide split off during esterification. Preferably the condensation is carried out in a solvent such as benzene or the like. β-Phenyl propionic acid or other esterifying functional derivatives thereof which are capable of reacting with hydroxyl groups may, of course, also be used as esterifying agents.

The new β-phenyl propionic acid esters of estradiol and 17-ethinyl estradiol not only exhibit a more prolonged effect but they have also a considerable increased activity in comparison to the unesterified alcohols and to the conventionally used estradiol benzoate.

The following examples serve to illustrate the present invention without, however, limiting the same thereto.

EXAMPLE 1

*Estradiol-3-β-phenyl propionate*

13 g. of α-estradiol of the melting point 178° C. are dissolved in 104 cc. of warm anhydrous pure acetone. 260 cc. of a solution of 24.7 g. of sodium hydroxide in distilled water are added to said solution and the resulting mixture is cooled to room temperature. 16 cc. of freshly prepared and distilled β-phenyl propionylchloride and 6.5 cc. of a concentrated sodium hydroxide solution containing 7.2 g. of sodium hydroxide dissolved in 100 cc. of distilled water are added simultaneously to the reaction mixture in the course of 1¾ hours while stirring vigorously. Stirring is continued for 45 minutes to cause all the acid chloride present therein to be decomposed. The ester is collected by filtration and is washed with sufficient amounts of 30% acetone to remove the mother liquors, thereafter with cold distilled water, and finally with warm water until the filtrate is substantially free of alkali on testing with red litmus paper. 14.8 g. of crude ester are obtained thereby.

The mother liquors are again reacted, as described above, with 8 cc. of β-phenyl propionylchloride and 3.25 cc. of sodium hydroxide solution whereby a second portion of the ester in the amount of 2.6 g. is obtained. Repeating said esterification yields a third portion in the amount of 1.2 g. The three portions of crude ester are combined and are recrystallized from a mixture of diethyl ether and n-hexane (1:1). Altogether 16 g. of estradiol-3-β-phenyl propionate are obtained in the form of colorless crystals of the melting point 90.5–92.0° C. and the rotatory power $(\alpha)_D^{20} = +62.7°$. On recrystallization from isopropyl ether, the melting point of the new ester is increased to 104.5–105.5° C.

EXAMPLE 2

*Estradiol-3,17-di-β-phenyl propionate*

30 cc. of β-phenyl propionylchloride are slowly added, while cooling, to a solution of 10 g. of α-estradiol having a melting point of 178° C., in 120 cc. of pyridine. The resulting cherry red solution is allowed to stand at room temperature for 16 hours. It is then poured into a mixture of dilute hydrochloric acid solution and ice. The precipitated gummy reaction product is dissolved in diethyl ether and the ethereal solution is successively washed with sodium carbonate solution, water, dilute hydrochloric acid, and finally with water. The washed ethereal solution is dried over sodium sulfate and is evaporated to dryness. The evaporation residue is recrystallized from acetone and yields 9.8 g. of colorless crystals melting at 125–127° C.

The gummy precipitate yields a second portion of the crude ester in an amount of 2.8 g. The mother liquors therefrom are evaporated to dryness, the evaporation residue is dissolved in benzene, and is filtered through a column of alumina. Benzene is removed from the filtrate by distillation. The evaporation residue is recrystallized from acetone. 1.4 g. of crude ester of the melting point 122–125° C. are obtained.

The first portion of the crude ester yields, on recrystallization from acetone, the pure ester melting at 130.0°–135.5° C. and having a rotatory power $(\alpha)_D^{20} = +38.7°$ (in dioxane).

EXAMPLE 3

*Estradiol-17-β-phenyl propionate*

A suspension of 6 g. of estradiol-3,17-di-β-phenyl propionate obtained according to Example 2, in 0.5% potassium carbonate solution in 1,260 cc. of 95% methanol is stirred continuously for 7 hours. Thereafter, a small amount of undissolved di-esters is removed by filtration. The filtrate is neutralized against phenolphthaleine by the addition of a 10% acetic acid solution. The solution is concentrated to about 100 cc., diluted with 400 cc. of water, and extracted with diethyl ether. The ethereal extract is successively washed with dilute hydrochloric acid solution, water, sodium carbonate solution, and finally with water. The extract is dried over sodium sulfate. The dried ethereal solution is concentrated to a volume of about 25 cc. n-Hexane is added in an amount sufficient to cause the concentrated ethereal solution to become slightly turbid. On seeding, the new esters recrystallizes when adding a further small amount of n-hexane. The mixture is kept at 0° C. for several hours. 3.9 g. of 17-β-phenyl propionate of the melting point 119–121° C. are obtained. The crude ester is recrystallized from a mixture of diethyl ether and n-hexane (1:1). Its melting point is 119.5–121.5° C.; its rotatory power $(\alpha)_D^{20} = +54.5°$ (in dioxane).

EXAMPLE 4

*17-ethinyl estradiol-3-β-phenyl propionate*

10 g. of ethinyl estradiol are dissolved in 40 cc. of pyridine and 10 cc. of benzene. The solution is cooled to −10° C. A solution of 8 g. of β-phenyl propionylchloride in 20 cc. of benzene is added, drop by drop, thereto while stirring vigorously. The reaction mixture is allowed to stand at a temperature between 0° C. and −5° C. for 24 hours and is then poured onto a mixture of ice and water. The benzene layer is separated from the aqueous layer and is washed successively with 5% sulfuric acid solution, 5% sodium hydroxide solution, and water. The washed benzene solution is dried over sodium sulfate, concentrated by evaporation to a small volume, and filtered through aluminum oxide. The benzene eluates are evaporated to dryness. The evaporation residue is recrystallized from a mixture of benzene and petroleum ether (2:1) and yields, after drying, 11 g. of the ester having a melting point of 105–106° C. and a rotatory power $(\alpha)_D^{20} = +3.3°$ (concentration: 0.9% in dioxane).

EXAMPLE 5

*Estrone-3-β-phenyl propionate*

A solution of 10 g. of estrone in 40 cc. of pyridine is cooled to −10° C. A solution of 10 g. of β-phenyl propionylchloride in 20 cc. of anhydrous benzene is added drop by drop thereto while stirring vigorously. The mixture is allowed to stand at a temperature between 0° C. and −5° C. for 24 hours and is poured onto a mixture of ice and water. The benzene layer is separated from the aqueous layer, successively washed with 5% sulfuric acid solution, 5% sodium hydroxide solution, and water, and dried over sodium sulfate. The dried solution is filtered through a column of 50 g. of aluminum oxide. The benzene eluates are evaporated to dryness. The evaporation residue is recrystallized from acetone. 12.7 g. of estrone-3-β-phenyl propionate of the melting point 146–148° C. and the rotatory power $(\alpha)_D^{20} = +111°$ (concentration: 0.9% in dioxane) are obtained.

The following table illustrates the more prolonged estrogenic activity exhibited by β-phenyl propionic acid esters of estradiol and 17-ethinyl estradiol over the activity of estradiol-17-monobenzoate and 17-ethinyl estradiol. To determine the activity of said compounds, 0.5 mg. of each ester were administered to 10 adult castrated female rats by subcutaneous injection of 1 cc. of peanut oil wherein the ester was dissolved. Vaginal smears were made daily and the number of days was determined after which 50% of the treated animals still showed full estrus response.

| Compound tested: | Duration of estrus in days |
|---|---|
| Estradiol-17-monobenzoate | 9 |
| Estradiol-17-β-phenyl propionate | 30 |
| Estradiol-3,17-di-β-phenyl propionate | 62 |
| 17-ethinyl estradiol | 9 |
| 17-ethinyl estradiol-3-β-phenyl propionate | 13 |

It is evident that the new esters exert a considerably prolonged estrogenic activity and are far superior in this respect to the known and most commonly used estrogenic hormone derivatives estradiol-17-monobenzoate and 17-ethinyl estradiol.

Of course, many changes and variations in the conditions of esterification, the solvents used, the temperature and duration of esterification, the methods of working up, isolating, and purifying the esterification mixtures and esterification products, and the like may be made by those skilled in the art in accordance with the principles set forth herein and in the claim annexed hereto.

I claim:
Estradiol-17-β-phenyl propionate.

References Cited in the file of this patent

UNITED STATES PATENTS

| 2,156,599 | Mieschen | May 2, 1939 |
| 2,233,025 | Mieschen | Feb. 25, 1941 |